United States Patent [19]

Hoppin et al.

[11] Patent Number: 4,829,038
[45] Date of Patent: May 9, 1989

[54] ALPHA-OLEFIN POLYMERIZATION CATALYST SYSTEM INCLUDING AN ADVANTAGEOUS MODIFIER COMPONENT

[75] Inventors: Charles R. Hoppin; Benjamin S. Tovrog, both of Naperville, Ill.

[73] Assignee: Amoco Corporation, Chicago, Ill.

[21] Appl. No.: 186,360

[22] Filed: Apr. 25, 1988

Related U.S. Application Data

[63] Continuation of Ser. No. 55,428, May 28, 1987, abandoned, which is a continuation-in-part of Ser. No. 875,185, Jun. 17, 1986, abandoned.

[51] Int. Cl.$^4$ ............................................... C08F 4/64
[52] U.S. Cl. ..................................... 502/125; 502/121; 502/122; 502/123; 502/124; 502/126; 502/127
[58] Field of Search ............... 502/121, 122, 123, 124, 502/125, 126, 127

[56] References Cited

U.S. PATENT DOCUMENTS

| | | | |
|---|---|---|---|
| 3,408,340 | 10/1968 | Tanaka et al. | 260/88.2 |
| 3,701,763 | 10/1972 | Wada et al. | 260/88.2 |
| 3,850,899 | 11/1974 | Wada et al. | 260/88.2 |
| 4,107,413 | 8/1978 | Giannini et al. | 526/114 |
| 4,107,414 | 8/1978 | Giannini et al. | 526/114 |
| 4,143,223 | 3/1979 | Toyota et al. | 526/125 |
| 4,180,636 | 12/1979 | Hirota et al. | 526/125 |
| 4,218,339 | 8/1980 | Zucchini et al. | 252/429 B |
| 4,220,745 | 9/1980 | Tanaka et al. | 526/125 |
| 4,226,741 | 10/1980 | Luciani et al. | 252/429 B |
| 4,290,915 | 9/1981 | Toyota et al. | 252/429 B |
| 4,297,463 | 10/1981 | Ueno et al. | 526/128 |
| 4,298,718 | 11/1981 | Mayr et al. | 526/125 |
| 4,330,649 | 5/1982 | Kioka et al. | 526/125 |
| 4,331,561 | 5/1982 | Luciani et al. | 252/429 B |
| 4,336,360 | 6/1982 | Giannini et al. | 526/114 |
| 4,365,048 | 12/1982 | Ueno et al. | 526/128 |
| 4,401,589 | 8/1983 | Kioka et al. | 252/429 B |
| 4,420,594 | 12/1983 | Ueno et al. | 502/125 X |
| 4,442,276 | 4/1984 | Kashiwa et al. | 526/125 |
| 4,472,524 | 9/1984 | Albizatti | 526/114 X |
| 4,473,660 | 9/1984 | Albizatti et al. | 526/125 X |
| 4,476,289 | 10/1984 | Mayr et al. | 526/125 |
| 4,522,930 | 6/1985 | Albizatti et al. | 526/125 X |
| 4,525,555 | 6/1985 | Tajima et al. | 502/122 X |
| 4,540,679 | 9/1985 | Arzoumanidis et al. | 526/124 X |
| 4,544,717 | 10/1985 | Mayr et al. | 526/125 |
| 4,565,798 | 1/1986 | Yamamoto et al. | 502/125 X |
| 4,612,299 | 9/1986 | Arzoumanidis et al. | 526/124 X |
| 4,619,981 | 10/1986 | Tajima et al. | 526/125 |
| 4,672,050 | 6/1987 | Sasaki et al. | 526/119 X |
| 4,742,139 | 5/1988 | Kioka et al. | 526/125 |
| 4,743,665 | 5/1988 | Sasaki et al. | 526/119 |

FOREIGN PATENT DOCUMENTS

| | | |
|---|---|---|
| 86643 | 8/1983 | European Pat. Off. |
| 86645 | 8/1983 | European Pat. Off. |
| 1554340 | 10/1970 | United Kingdom |
| 1539900 | 2/1979 | United Kingdom |
| 2111066 | 6/1983 | United Kingdom |

OTHER PUBLICATIONS

Chemical Abstracts, vol. 61, 13339a-e.
Chemical Abstrtacts, 1955, 909g.
Chemical Abstracts, 1956, 3217h.
Chemical Abstracts, 1962, 7344h.
Die Angewandte Makromolekulare Chemie, 120 (1984), pp. 73–90.
Chemicky Primysl, 36/61, 72 (1986), No. 2.
Bulletin of the Polish Academy of Science, vol. XII, No. 5, pp. 281–287 (1964).

*Primary Examiner*—Patrick P. Garvin
*Attorney, Agent, or Firm*—Wallace L. Oliver; William H. Magidson; Ralph C. Medhurst

[57] ABSTRACT

An olefin polymerization catalyst system comprises a solid, hydrocarbon-insoluble, magnesium-containing, titanium-containing, electron donor-containing component; an alkyl aluminum compound; and organosilane compound selected from the group consisting of diisobutyldimethoxysilane, diisopropyldimethoxysilane, t-butyltrimethoxysilane and di-t-butyldimethoxysilane, and mixtures thereof.

14 Claims, No Drawings

ALPHA-OLEFIN POLYMERIZATION CATALYST SYSTEM INCLUDING AN ADVANTAGEOUS MODIFIER COMPONENT

CROSS REFERENCE TO RELATED APPLICATIONS

This is a continuation of application Ser. No. 055,428, filed May 28, 1987, and now abandoned, which is in turn a continuation-in-part of Ser. No. 875,185, filed June 17, 1986, and now abandoned.

BACKGROUND OF THE INVENTION

This invention relates to olefin polymerization catalysts and particularly relates to specific modifier compounds useful in a supported alpha-olefin polymerization catalyst system.

Use of solid, transition metal-based, olefin polymerization catalyst components is well known in the art including such solid components supported on a metal oxide, halide or other salt such as widely-described magnesium-containing, titanium halide-based catalyst components. Also known is incorporating an electron donor compound into the titanium-containing component. An olefin polymerization system typically comprises a titanium-containing compound, an alkylaluminum compound and an electron donor modifier compound. The electron donor modifier used in combination with the alkyl aluminum compound and solid titanium-containing compound is distinct from the electron donor which may be incorporated within the titanium-containing compound. Many classes of electron donors have been disclosed for possible use as electron donor modifiers used during polymerization.

One class of such electron donor compounds is organosilanes. For example in U.S. Pat. No. 4,540,679, organosilanes, especially aromatic silanes are described. Use of organosilanes as cocatalyst modifiers also is described in Published U.K. Application No. 2,111,066 and Published European Application Nos. 86,288, 86,471, 86,472 and 86,473. Other aliphatic and aromatic silanes used in polymerization catalysts are described in U.S. Pat. Nos. 4,420,594, 4,525,555 and 4,565,798. Typically, it has been found that aliphatic silanes are not as effective as aromatic silanes. It has been found that certain aromatic silanes may produce undesirable products. The invention described herein is a species of aliphatic silane which performs better than other aliphatic silanes as an olefin catalyst electron donor modifier and in many instances as well as, or better, than aromatic silanes.

SUMMARY OF THE INVENTION

An olefin polymerization catalyst system comprises a solid, hydrocarbon-insoluble, magnesium-containing, titanium-containing, electron donor-containing component; an alkyl aluminum compound; and organosilane compound selected from the group consisting of diisobutyldimethoxysilane, diisopropyldimethoxysilane, t-butyltrimethoxysilane and di-t-butyldimethoxysilane, and mixtures thereof.

BRIEF DESCRIPTION OF THE INVENTION

The olefin polymerization catalyst system of this invention comprises a supported titanium-containing component, an alkyl aluminum component and a specific class of aliphatic organosilane compounds. Such class of aliphatic organosilane compounds found most useful in this invention is based on hindered alkylalkoxysilanes and particularly on branched alkyl such as isobutyl and branched butyl (such as isobutyl and t-butyl) methoxy silanes. Also, included in this class of organosilane compounds found particularly useful are isopropylalkoxysilanes. Of particular interest is isobutylalkoxysilanes and, particularly, isobutylmethoxysilanes. Of these, diisobutyldimethoxysilane is preferred. Other preferred branched butyl silanes are t-butyltrimethoxysilane and di-t-butyldimethoxysilane. A preferred branched alkyl silane is diisopropyldimethoxysilane. Mixtures of silanes may be used.

The aliphatic silane most useful in this invention is diisobutyldimethoxysilane. This compound may be prepared by methods known to the art such as reacting isobutylene with trichlorosilane in a hydrosilylation reaction to form isobutyltrichlorosilane. This compound may be reacted with a Grignard-type reagent such as isobutyl magnesium chloride followed by methanolysis with a methoxide to form diisobutyldimethoxysilane.

In another representation of this invention, the silanes useful in this invention may be described as:

RR'Si(OCH$_3$)$_2$ wherein R and R' are isopropyl, isobutyl or t-butyl. Silanes with mixed alkyl groups, such as isobutylisopropyldimethoxysilane, isobutyl-t-butyldimethoxysilane and isopropyl-t-butyldimethoxysilane, are included.

The branched alkylalkoxysilanes of this invention, especially diisobutyldimethoxysilane, t-butyltrimethoxysilane, di-t-butyldimethoxysilane, and diisopropyldimethoxysilane show advantageous results when used as a cocatalyst modifier in olefin, particularly propylene, polymerization when used with a supported titanium-containing component. Such silanes of this invention are particularly advantageous used in gas-phase olefin polymerizations.

Other possible hindered alkylmethoxysilanes include diisopentyldimethoxysilane, dineopentyldimethoxysilane, di-t-pentyldimethoxysilane, neopentyltrimethoxysilane, and t-butyltrimethoxysilane. Another group of hindered alkylmethoxysilanes include silacylic compunds with structures such as:

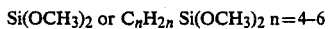

Si(OCH$_3$)$_2$ or C$_n$H$_{2n}$ Si(OCH$_3$)$_2$ n=4–6 and substituted silacycles having a formula

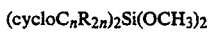

(cycloC$_n$R$_{2n}$)$_2$Si(OCH$_3$)$_2$ wherein R=hydrogen or an alkyl group having 1 to about 5 carbon atoms and n=4–6, such as:

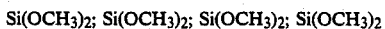

Si(OCH$_3$)$_2$; Si(OCH$_3$)$_2$; Si(OCH$_3$)$_2$; Si(OCH$_3$)$_2$

Titanium-containing components useful in this invention generally are supported on hydrocarbon-insoluble, magnesium-containing compounds in combination with an electron donor compound. Such supported titanium-containing olefin polymerization catalyst component typically is formed by reacting a titanium(IV) halide, an organic electron donor compound and a magnesium-containing compound. Optionally, such supported titanium-containing reaction product may be further treated or modified by comminution or further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups I-III; magnesium alcoholates; or magnesium alkyls.

One possible magnesium-containing compound, described in U.S. Pat. No. 4,227,370, is based on at least one magnesium alcoholate which may be pretreated with at least one modifier such as mineral acid or anhydrides of sulfur, organometallic, chalcogenide derivative of hydrogen sulfide, and organic acids and esters thereof. Such magnesium-containing compound may be the pretreatment product of at least one magnesium alcoholate, at least one Group II or IIIA metal alkyl and, optionally, at least one modifier such as a mineral acid or an anhydride, sulfur, organometallic chalcogenide derivatives of hydrogen sulfide, organic acids and organic acid esters. Solid magnesium alkoxide may be milled prior to further treatment. In another catalyst component, magnesium ethoxide may be reacted with an aromatic ester such as phenyl benzoate prior to further treatment with a Lewis acid.

Another possible catalyst component is described in U.S. application Ser. No. 674,996, filed Dec. 26, 1984, assigned to a common assignee, incorporated by reference herein. The catalyst component described therein is prepared by complexing a magnesium alkyl composition with a specific class of hindered aromatic ester such as ethyl 2,6-dimethylbenzoate followed by reaction with a compatible precipitation agent such as silicon tetrachloride and a suitable titanium(IV) compound in combination with an organic electron donor compound in a suitable diluent.

Another possible, and preferable, catalyst component is described in U.S. application Ser. No. 875,180, filed June 17, 1986, (Case 25,166) which is a continuation-in-part to U.S. application Ser. No. 741,858, filed June 6, 1985, which was a continuation-in-part to U.S. application Ser. Nos. 629,910, filed July 9, 1984, and 592,910, filed Mar. 23, 1984, now U.S. Pat. No. 4,540,679, all of which are assigned to a common assignee and are incorporated by reference herein.

The possible solid catalyst components listed above only are illustrative of many possible solid, magnesium-containing, titanium halide-based, hydrocarbon-insoluble catalyst components useful in this invention and known to the art. This invention is not limited to a specific supported catalyst component.

Titanium(IV) compounds useful in preparing the solid, titanium-containing catalyst component of invention are titanium halides and haloalcoholates having 1 to about 20 carbon atoms per alcoholate group. Mixtures of titanium compounds can be employed if desired. Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides, particularly titanium tetrachloride ($TiCl_4$), are most preferred.

Organic electron donors useful in preparation of stereospecific supported titanium-containing catalyst components many times can be organic compounds containing one or more atoms of oxygen, nitrogen, sulfur, and phosphorus. Such compounds include organic acids, organic acid esters, alcohols, ethers, aldehydes, ketones, amines, amine oxides, amides, thiols and various phosphorous acid esters and amides, and like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

Preferred titanium component electron donor compounds include esters of aromatic acids. Preferred organic electron donors are $C_1$-$C_6$ alkyl esters of aromatic mono- and dicarboxylic acids and halogen-, hydroxyl-, oxo-, alkyl-, alkoxy-, aryl-, and aryloxy-substituted aromatic mono- and dicarboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl-p-toluate. An especially preferred aromatic ester is a dialkylphthalate ester in which the alkyl group contains from about two to about ten carbon atoms. Examples of preferred phthalate ester are diisobutylphthalate, ethylbutylphthalate, diethylphthalate, and di-n-butylphthalate.

The electron donor component used in preparation of the solid catalyst component is used in an amount ranging from about 0.001 to about 1.0 mole per gram atom of titanium, and preferably from about 0.005 to about 0.8 mole per gram atom. Best results are achieved when this ratio ranges from about 0.01 to about 0.6 mole per gram atom of titanium.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the above-described solid reaction product may be washed with an inert liquid hydrocarbon or halogenated hydrocarbon before contact with a Lewis acid. If such a wash is conducted it is preferred to substantially remove the inert liquid prior to contacting the washed solid with Lewis acid.

Due to the sensitivity of catalyst components to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin. As noted above, purification of any diluent to be employed also aids in removing poisons from the preparative system.

As a result of the above-described preparation there is obtained a solid reaction product suitable for use as a catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although the chemical structure of the catalyst components described herein is not presently known, the components preferably contain from about 1 to about 6 wt. % titanium, from about 10 to about 25 wt. % magnesium, and from about 45 to about 65 wt. % halogen. Preferred catalyst components made according to this invention contain from about 1.0 to about 3 wt. % titanium, from about 15 to about 21 wt. % magnesium and from about 55 to about 65 wt. % chlorine.

The titanium-containing catalyst component of this invention may be prepolymerized with an alpha-olefin before use as a polymerization catalyst component. In prepolymerization, catalyst and an organoaluminum compound cocatalyst such as triethylaluminum are contacted with an alpha-olefin such as propylene under polymerization conditions, preferably in the presence of a modifier such as a silane and in an inert hydrocarbon such as hexane. Typically, the polymer/catalyst weight ratio of the resulting prepolymerized component is about 0.1:1 to about 20:1. Prepolymerization forms a coat of polymer around catalyst particles which in many instances improves particle morphology, activity, stereospecificity, and attrition resistance. A particularly useful prepolymerization procedure is described in U.S. Pat. No. 4,579,836, incorporated herein by reference.

The titanium-containing catalyst component of this invention is used in a polymerization catalyst containing a cocatalyst component including a Group II or III metal alkyl and, preferably, an alkyl aluminum compound together with the organosilane component of this invention.

Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Alkyl aluminum compounds are most preferred. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethylaluminum sesquichloride, diisobutylaluminum hydride, and the like.

A typical catalyst composition is formed by combining the supported titanium-containing compound described in this invention and an alkyl aluminum compound together with the electron donor silane modifier of this invention. Typically, useful aluminum-to-titanium atomic ratios in such catalyst formulations are about 10 to about 500 and preferably about 30 to about 300. Preferred aluminum compound-to-silane molar ratios are about 1 to about 40. Typical aluminum-to-silane compound molar ratios are about 3 to about 30.

The above-described catalysts of this invention are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry-, bulk-, and vapor-phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from about 0.2 to 0.02 milligrams of catalyst to gram of polymer produced.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerizing according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not be below the vapor pressure at the polymerization temperature of the alpha-olefin to be polymerized.

The polymerization time will generally range from about ½ to several hours in batch processes with corresponding average residence times in continuous processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use, such as by distillation, percolation through molecular sieves, contacting with a compound such as an alkylaluminum compound capable of removing trace impurities, or by other suitable means.

Examples of gas-phase polymerization processes in which the catalyst of this invention is useful include both stirred bed reactors and fluidized bed reactor systems and are described in U.S. Pat. Nos. 3,957,448; 3,965,083; 3,971,768; 3,970,611; 4,129,701; 4,101,289; 3,652,527; and 4,003,712, all incorporated by reference herein. Typical gas phase olefin polymerization reactor systems comprise a reactor vessel to which olefin monomer and catalyst components can be added and which contain an agitated bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid which can be liquid monomer, can be added to polymerizing olefin through the recycle gas system in order to control temperature.

Irrespective of polymerization technique, polymerization is carried out under conditions that exclude oxygen, water, and other materials that act as catalyst poisons.

Also, according to this invention, polymerization can be carried out in the presence of additives to control polymer molecular weights. Hydrogen is typically employed for this purpose in a manner well known to persons of skill in the art.

Although not usually required, upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. Further, levels of stereorandom by-products are sufficiently low so that useful products can be obtained without separation thereof. The polymeric products produced in the presence of the invented catalysts can be fabricated into useful articles by extrusion, injection molding, and other common techniques.

The invention described herein is illustrated, but not limited, by the following Examples and Comparative Runs.

EXAMPLES 1-7

A 1.5 wt. % suspension of 2 grams of solid, hydrocarbon-insoluble, magnesium-containing, electron donor-containing, titanium chloride-based catalyst component in 160 milliliters of hexane was prepared together with a co-catalyst solution containing 3.1 milliliters of 1 molar hexane solution of silane component in 20 milliliters of 1.5 molar TEA solution in hexane.

A series of propylene polymerization runs was performed in a laboratory scale continuous unit based on that described in U.S. Pat. No. 3,965,083. A cylindrical reactor vessel of approximately four inches in diameter and 12 inches in length was equipped with three recycle gas nozzles spaced equidistantly along the bottom of the reactor and three liquid quench nozzles spaced equidistantly along the top of the reactor. The reactor was equipped with an off-gas port for recycling reactor gas through a condenser and back through a recycle line to the recycle nozzles in the reactor. Propylene liquid was used as the quench liquid. During operation polypropylene powder was produced in the reactor bed, flowed over a weir, and discharged though a powder discharge system into a secondary closed vessel blanketed with nitrogen. Polymerization temperature and pressure were maintained at 160° F. (71° C.) and 300 psig respectively. The polymer bed was agitated by paddles attached to a longitudinal shaft with in the reactor rotating at about 50 rpm. Hydrogen content in the reactor vapor was maintained at 0.2–0.4 wt. %. Titanium-containing catalyst component was introduced into the reactor through a liquid propylene-flushed catalyst addition nozzle. Mixed co-catalyst (TEA and silane in a hexane solution), maintained at 70° F. (21° C.) was added through a co-catalyst addition nozzle flushed with propylene. Results are shown in Table I.

Table I summarizes the polymerization results using the polymerization system including a silane modifier of this invention. Also shown are comparative runs using aromatic silanes and other aliphatic silanes as catalyst modifiers. "Yield" (grams of polymer produced per gram of solid catalyst component) was determined by magnesium analysis of the polymer product. "Extractables" were determined by measuring the loss in weight of a dry sample of ground polymer after being extracted in boiling n-hexane for four to six hours.

TABLE I

| | Gas-Phase Polymerization Performance | | | | |
|---|---|---|---|---|---|
| Example (Run) | Cocatalyst Modifier[1] | Al/Si/Ti | Yield (g/g) | Extractables (wt. %) | Bulk Density (lbs/ft$^3$) |
| 1 | IBTMSi | 50/5/1 | 8,900 | 1.2 | 28.6 |
| 2 | DIBDMSi | 50/5/1 | 12,100 | 1.3 | 28.8 |
| 3 | DIBDMSi | 50/8.3/1 | 12,100 | 1.0 | 28.8 |
| (A) | DPDMSi | 50/5/1 | 11,000 | 1.3 | 29.4 |
| (B) | DPDMSi | 50/5/1 | 10,300 | 2.2 | 28.8 |
| 4 | IBTMSi | 50/5/1 | 7,900 | 2.2 | 28.9 |
| 5 | DIBDMSi | 50/5/1 | 11,000 | 1.7 | 28.7 |
| (C) | PTMDMSi | 50/5/1 | 8,300 | 2.2 | 28.9 |
| (D) | PTMDMSi | 50/3.5/1 | 7,200 | 10.7 | 26.7 |
| (E) | NBTMSi | 50/5/1 | 8,900 | 1.2 | — |
| (F) | CHTMSi | 50/5/1 | 5,700 | 0.7 | 28.1 |
| (G) | CHTMSi | 50/5/1 | 6,300 | 0.6 | — |

TABLE I-continued

Gas-Phase Polymerization Performance

| Example (Run) | Cocatalyst Modifier[1] | Al/Si/Ti | Yield (g/g) | Extractables (wt. %) | Bulk Density (lbs/ft³) |
|---|---|---|---|---|---|
| (H) | DPDMSi | 50/5/1 | 9,200 | 1.0 | 28.5 |
| (J) | CHMDMSi | 50/5/1 | 8,800 | 1.8 | 28.7 |
| (K) | ETMSi | 50/5/1 | 8,500 | 1.5 | 28.3 |
| (L) | DEDESi | 50/5/1 | 6,500 | 4.2 | 28.4 |
| 6 | IBTMSi | 50/5/1 | 7,400 | 1.0 | 28.3 |
| 7 | IBMDMSi | 50/5/1 | 7,400 | 2.4 | — |

[1]Cocatalyst Modifiers:
IBTMSi = Isobutyltrimethoxysilane
DIBDMSi = Diisobutyldimethoxysilane
DPDMSi = Diphenyldimethoxysilane
PTMDMSi = p-Tolylmethyldimethoxysilane
NBTMSi = n-Butyltrimethoxysilane
CHTMSi = Cyclohexyltrimethoxysilane
IBMDMSi = Isobutylmethyldimethoxysilane
CHMDMSi = Cyclohexylmethyldimethoxysilane
DEDESi = Diethyldiethoxysilane
ETMSi = Ethyltrimethoxysilane

EXAMPLES 8-10

A catalyst component was prepared according to Example 21 of U.S. Ser. No. 875,180, filed June 17, 1986, assigned to a common assignee and incorporated by reference herein. Propylene polymerizations were performed using the continuous gas-phase method described in Examples 1-7. Results are shown in Table II.

TABLE II

Gas-Phase Polymerization Performance

| Example (Run) | Cocatalyst Modifier[1] | Al/Si/Ti | Yield (g/g) | Extractables (wt. %) | Bulk Density (lbs/ft³) |
|---|---|---|---|---|---|
| 8 | DIBDMSi | 200/20/1 | 22,100 | 1.4 | 28.4 |
| 9 | IBTMSi | 50/5/1 | 19,000 | 1.3 | 26.0 |
| 10 | IBTMSi | 50/3.5/1 | 21,000 | 1.7 | 25.8 |
| (M) | DPDMSi | 100/10/1 | 19,700 | 1.3 | 27.5 |
| (N) | ETMSi | 50/5/1 | 13,600 | 1.7 | 27.0 |

[1]Cocatalyst Modifiers:
IBTMSi = Isobutyltrimethoxysilane
DIBDMSi = Diisobutyldimethoxysilane
DPDMSi = Diphenyldimethoxysilane
ETMSi = Ethyltrimethoxysilane

EXAMPLES 11-14

A titanium-containing, magnesium-containing, electron donor-containing catalyst component was prepared according to Example 21 of U.S. Ser. No. 875,180, filed June 17, 1986, assigned to a common assignee and incorporated by reference herein.

The solid titanium-containing catalyst components prepared above were tested in batch hexane-slurry propylene polymerizations. A two-liter Parr reactor was charged with 650 milliliters of hexane, 150 psig of propylene, and 130 ml of hydrogen gas. About 20 milligrams of titanium-containing catalyst component together with a triethylaluminum (TEA)-based cocatalyst system including an organosilane cocatalyst modifier were used in the polymerization test run for two hours at 71° C. Specifically, a two-liter Parr reactor was charged with 650 milliliters of hexane and the temperature was raised to about 43° C. The catalyst system was formed from a mixture of 1.0 milliliter of 1.56 molar TEA in hexane, 1.6 milliliters of 0.1 molar organosilane in hexane and 5 milliliters of additional hexane, into which the solid component was rinsed with about 5 milliliters of hexane. The resulting mixture was flushed into the reactor with about 50 milliliters of hexane. Following catalyst addition, 130 milliliters of hydrogen were added, the reactor temperature was raised to 71° C. and the reactor was pressurized to 150 psig with propylene. Polymerization continued at this temperature and pressure for two hours.

TABLE III

Slurry-Phase Polymerization Performance

| Example (Run) | Cocatalyst Modifier[1] | Al/Si/Ti | Yield (g/g) | Hexane Solubles (wt. %) | Extractables (wt. %) |
|---|---|---|---|---|---|
| 11 | DIBDMSi | 200/10/1 | 12,600 | 1.1 | 2.1 |
| 12 | IBTMSi | 200/10/1 | 9,200 | 1.4 | 2.4 |
| 13 | IBTMSi | 200/10/1 | 12,300 | 2.2 | — |
| (O) | DPDMSi | 200/10/1 | 11,600 | 0.9 | 2.0 |
| 14 | IBMDMSi | 200/10/1 | 10,950 | 2.0 | 2.7 |
| (P) | ATMSi | 200/10/1 | 9,200 | 2.1 | 2.3 |
| (Q) | CHTMSi | 200/10/1 | 10,700 | 1.0 | 2.1 |
| (R) | TMSi | 200/10/1 | 5,000 | 3.2 | 3.5 |

[1]Cocatalyst Modifiers:
IBTMSi = Isobutyltrimethoxysilane
DIBDMSi = Diisobutyldimethoxysilane
DPDMSi = Diphenyldimethoxysilane
ATMSi = Amyltrimethoxysilane
CHTMSi = Cyclohexyltrimethoxysilane
TMSi = tetramethoxysilane
IBMDMSi = Isobutylmethyldimethoxysilane

EXAMPLES 15-21 - Comparative Runs AA-QQ

A series of polymerization test runs were performed as described in Examples 11-14 but using different organosilane compounds as a modifier component. The Al/Si/Ti ratio was 200/20/1 in all runs. That the results are shown in the Table IV.

TABLE IV

Slurry-Phase Polymerization Performance

| Example (Run) | Cocatalyst Modifier[1] | Yield (g/g) | Hexane Solubles (wt. %) | Extractables (wt. %) | Melt Flow Rate (g/10 min) |
|---|---|---|---|---|---|
| 15 | DIBDMSi[2] | 13,500 | 0.8 | 1.5 | 2.0 |
| 16 | TBTMSi[3] | 11,500 | 0.6 | 0.8 | 1.5 |
| 17 | TBTMSi[3] | 13,300 | 0.6 | 1.3 | 0.7 |
| 18 | DIPDMSi[3] | 12,000 | 0.6 | 1.1 | 2.5 |
| 19 | DTBDMSi[3] | 15,800 | 0.6 | 1.6 | 0.4 |
| 20 | DTBDMSi[5] | 20,000 | 0.9 | 1.8 | 1.4 |
| 21 | DTBDMSi[6] | 19,000 | 1.0 | 1.6 | 1.0 |
| (AA) | DIBDESi | 10,000 | 2.2 | 3.3 | 3.4 |
| (BB) | DIBDESi | 10,600 | 2.4 | 2.8 | 9.3 |
| (CC) | DIBDIPSi | ~7,500 | >12 | —[4] | — |
| (DD) | DIBDIPSi | ~6,500 | >25 | —[4] | — |
| (EE) | DIBDIBSi | 6,700 | >43 | 4.6[4] | 15.2 |
| (FF) | IBTESi | 9,800 | 1.8 | 2.3 | — |
| (GG) | IBTESi | 8,900 | 2.3 | 2.0 | — |
| (HH) | IBTESi | 12,200 | 2.7 | 4.0 | 6.5 |
| (JJ) | IBTESi | 12,000 | 3.1 | 3.2 | 5.7 |
| (KK) | IBTIBSi | 7,600 | >24 | 4.2[4] | 13.9 |
| (LL) | IBTIBSi | 9,600 | >32 | 6.1[4] | 9.1 |
| (MM) | SBTESi | 10,400 | 2.4 | 2.6 | 5.2 |
| (NN) | SBTESi[3] | 11,200 | 2.0 | 2.6 | 4.9 |
| (OO) | DNBDMSi | 10,600 | 1.7 | 2.7 | 6.0 |
| (PP) | IBMDMSi | 10,800 | 1.7 | 1.8 | 4.6 |

TABLE IV-continued

Slurry-Phase Polymerization Performance

| Example (Run) | Cocatalyst Modifier[1] | Yield (g/g) | Hexane Solubles (wt. %) | Extractables (wt. %) | Melt Flow Rate (g/10 min) |
|---|---|---|---|---|---|
| (QQ) | DCHDMSi[3] | 10,000 | 0.9 | 2.1 | 1.3 |

[1] Cocatalyst Modifiers:
- DIBDMSi = Diisobutyldimethoxysilane
- TBTMSi = t-Butyltrimethoxysilane
- DIPDMSi = Diisopropyldimethoxysilane
- DTBDMSi = Di-t-Butyldimethoxysilane
- DIBDESi = Diisobutyldiethoxysilane
- DIBDIPSi = Diisobutyldiisopentoxysilane
- DIBDIBSi = Diisobutyldiisobutoxysilane
- IBTESi = Isobutyltriethoxysilane
- IBTIBSi = Isobutyltriisobutoxysilane
- SBTESi = s-Butyltriethoxysilane
- DNBDMSi = Di-n-butyldimethoxysilane
- IBMDMSi = Isobutylmethyldimethoxysilane
- DCHDMSi = Dicyclohexyldimethoxysilane

[2] Results listed for DIBDMSi are an average of separate test runs.
[3] Results are an average of 2 separate test runs.
[4] Polymer could not be filtered.
[5] 24 mmole of $H_2$ used; average of 2 test runs.
[6] 16 mmole of $H_2$ used; average of 3 test runs.

EXAMPLES 22-24

A titanium-containing, magnesium-containing, electron donor-containing catalyst component was prepared as described in U.S. Ser. No. 875,180, filed June 17, 1986, assigned to a common assignee and incorporated by reference herein. Propylene polymerizations were performed using the continuous gas-phase method described in Examples 1-7 using diisobutyldimethoxysilane and diisobutyldimethoxysilane as modifiers. Results are shown in Table V.

TABLE V

Gas-Phase Polymerization Performance

| Example (Run) | Cocatalyst Modifier[1] | Al/Si/Ti | Yield (g/g) | Extractables (wt. %) | Bulk Density (lbs/ft³) | MFR (g/min) |
|---|---|---|---|---|---|---|
| 22 | DIBDMSi | 100/17/1 | 20,000 | 1.1 | 25.7 | 3.9 |
| 23 | DIPDMSi | 100/17/1 | 20,000 | 1.0 | 25.5 | 2.0 |
| 24 | DIPDMSi | 100/8/1 | 21,000 | 0.9 | 26.2 | 2.3 |

[1] Cocatalyst Modifiers:
DIBDMSi = Diisobutyldimethoxysilane
DIPDMSi = Diisopropyldimethoxysilane

What is claimed is:

1. An olefin polymerization catalyst system comprising a solid, hydrocarbon-insoluble, magnesium-containing, titanium-containing, electron donor-containing component; an alkyl aluminum compound; and an organosilane compound selected from the group consisting of diisobutyldimethoxysilane, diisopropyldimethoxysilane, t-butyltrimethoxysilane and di-t-butyldimethoxysilane.

2. The catalyst system of claim 1 wherein the organosilane compound is diisobutyldimethoxysilane.

3. The catalyst system of claim 1 wherein the organosilane compound is diisopropyldimethoxysilane.

4. The catalyst system of claim 1 wherein the organosilane compound is t-butyltrimethoxysilane or di-t-butyldimethoxysilane.

5. The catalyst system of claim 1 wherein the organosilane compound is t-butyltrimethoxysilane.

6. The catalyst system of claim 1 wherein the organosilane compound is di-t-butyldimethoxysilane.

7. An olefin polymerization catalyst system comprising a solid, hydrocarbon-insoluble, magnesium-containing, titanium-containing, electron donor-containing component; triethylaluminum; and an organosilane compound selected from the group consisting of diisobutyldimethoxysilane, diisopropyldimethoxysilane, t-butyltrimethoxysilane and di-t-butyldimethoxysilane.

8. The catalyst system of claim 7 wherein the organosilane compound is diisobutyldimethoxysilane.

9. The catalyst system of claim 7 wherein the organosilane compound is diisopropyldimethoxysilane.

10. The catalyst system of claim 7 wherein the organosilane compound is t-butyltrimethoxysilane or di-t-butyldimethoxysilane.

11. The catalyst system of claim 7 wherein the organosilane compound is t-butyltrimethoxysilane.

12. The catalyst system of claim 7 wherein the organosilane compound is di-t-butyldimethoxysilane.

13. An olefin polymerization catalyst system comprising a solid, hydrocarbon-insoluble, magnesium-containing, titanium-containing, electron donor-containing component; an alkyl aluminum compound; and an organosilane compound having a structure:

$$RR'Si(OCH_3)_2$$

wherein R and R' are isobutyl-, isopropyl- or t-butyl groups.

14. An olefin polymerization catalyst system comprising a solid, hydrocarbon-insoluble, magnesium-containing, titanium-containing, electron donor-containing component; an alkyl aluminum compound; and an organosilane compound selected from the group consisting of isobutyltrimethoxysilane and mixtures of isobutyltrimethoxysilane and diisobutyldimethoxysilane.

* * * * *